United States Patent
Tiryaki et al.

(10) Patent No.: US 12,377,953 B2
(45) Date of Patent: Aug. 5, 2025

(54) RAIL FOR THE FASTENING OF EQUIPMENT ELEMENTS IN AIRCRAFT, IN PARTICULAR SEATS, AND METHOD FOR PRODUCTION

(71) Applicant: Airbus Operations GmbH, Hamburg (DE)

(72) Inventors: Memis Tiryaki, Hamburg (DE); Wolfgang Eilken, Hamburg (DE); Sven Hardy Werner, Hamburg (DE); André Zybala, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 183 days.

(21) Appl. No.: 18/296,644

(22) Filed: Apr. 6, 2023

(65) Prior Publication Data

US 2023/0242237 A1     Aug. 3, 2023

Related U.S. Application Data

(62) Division of application No. 16/837,422, filed on Apr. 1, 2020, now Pat. No. 11,667,370.

(30) Foreign Application Priority Data

Apr. 8, 2019   (DE) ............ 10 2019 109 149.7

(51) Int. Cl.
*B64C 1/20*     (2006.01)
*B29C 45/00*    (2006.01)
(Continued)

(52) U.S. Cl.
CPC ............ *B64C 1/20* (2013.01); *B29C 45/0055* (2013.01); *B32B 3/04* (2013.01);
(Continued)

(58) Field of Classification Search
CPC ......... B64C 1/20; B64C 1/18; B29C 45/0055; B29C 2045/0008; B29C 33/0016;
(Continued)

(56) References Cited

U.S. PATENT DOCUMENTS 3,088,561 A   5/1963  Ruzicka
5,556,565 A   9/1996  Kirkwood et al.
(Continued)

FOREIGN PATENT DOCUMENTS

DE   102004039189 A1   2/2006
DE   102008018542 A1   10/2009
(Continued)

OTHER PUBLICATIONS

Kunststoff-Magazin.de, Aluminum-plastic hybrid goes into series production, Apr. 25, 2013, obtained from https://www.kunststoff-magazin.de/oberflaechentechnik/haftvermittler-vestamelt-aluminium-kunststoff-hybrid-geht-in-serie.htm (Year: 2013).*
(Continued)

*Primary Examiner* — Brian Handville
(74) *Attorney, Agent, or Firm* — Greer, Burns & Crain, Ltd.

(57) ABSTRACT

A rail for the fastening of equipment elements, such as, in particular, seats, in aircraft, includes a holding region for connection to an equipment element of an aircraft, and a support region to fasten the rail to a carrier element of the aircraft. The rail has a metallic shell which is, for example, made of titanium and which is filled with a fiber-reinforced thermoplastic filler material which is reinforced by short fibers. To produce the rail, a metallic molded part is used as a casting mold and is filled, for example by injection, with the filler material and, after the rail has been produced, forms the metallic shell for the filler material.

6 Claims, 5 Drawing Sheets

(51) Int. Cl.
   *B32B 3/04* (2006.01)
   *B32B 15/08* (2006.01)
   *B32B 15/14* (2006.01)
   *B32B 15/20* (2006.01)
(52) U.S. Cl.
   CPC ....... *B29C 2045/0008* (2013.01); *B32B 15/08* (2013.01); *B32B 15/14* (2013.01); *B32B 15/20* (2013.01); *B32B 2311/18* (2013.01); *B32B 2605/18* (2013.01)
(58) Field of Classification Search
   CPC ..... B29C 45/14631; B32B 3/04; B32B 15/08; B32B 15/14; B32B 15/20; B32B 2311/18; B32B 2605/18; B64D 11/0696
   See application file for complete search history.

(56) References Cited

U.S. PATENT DOCUMENTS

| | | | |
|---|---|---|---|
| 6,260,813 | B1 | 7/2001 | Whitcomb |
| 10,035,600 | B2 | 7/2018 | Vichniakov et al. |
| 10,472,070 | B2 | 11/2019 | Born et al. |
| 2002/0130219 | A1 | 9/2002 | Parseghian et al. |
| 2006/0283133 | A1 | 12/2006 | Westre et al. |
| 2016/0045961 | A1* | 2/2016 | Umehara ................ B32B 15/08 428/458 |
| 2019/0092478 | A1 | 3/2019 | Gilbert |

FOREIGN PATENT DOCUMENTS

| | | |
|---|---|---|
| DE | 102015100189 A1 | 7/2016 |
| DE | 102016208650 A1 | 11/2017 |
| EP | 3020628 A1 | 5/2016 |
| FR | 2864940 A1 | 7/2005 |
| WO | 2011064263 A2 | 6/2011 |

OTHER PUBLICATIONS

German Search Report for German Patent Application No. 102019109149.7 dated Mar. 7, 2020; priority document.

* cited by examiner

RAIL FOR THE FASTENING OF EQUIPMENT ELEMENTS IN AIRCRAFT, IN PARTICULAR SEATS, AND METHOD FOR PRODUCTION

CROSS-REFERENCES TO RELATED APPLICATIONS

This application claims the benefit of the German patent application No. 10 2019 109 149.7 filed on Apr. 8, 2019, the entire disclosures of which are incorporated herein by way of reference.

FIELD OF THE INVENTION

The invention relates to a rail for the fastening of equipment elements in aircraft, which comprises a holding region for connection to an equipment element of an aircraft, and a support region in order to fasten the rail to a carrier element of the aircraft. Furthermore, the invention relates to a method for producing a rail for the fastening of equipment elements in aircraft, in which a molded part which has a holding region for the fastening of equipment elements of an aircraft and a support region for fastening to a carrier element of the aircraft is provided from a metal. In particular, the rail is used for fastening seats in aircraft.

BACKGROUND OF THE INVENTION

In the fuselage of aircraft and particularly in the cabin, equipment elements are fastened by means of rails or fastening rails. Equipment elements of this kind are, for example, seats or passenger seats which are fixed in the region of the cabin floor. Other equipment elements, such as, for example, galley elements, toilets, etc., can also be fastened in the aircraft fuselage by means of rails. Moreover, service carts can, for example, also be held by rails and moved along the rails, such that they are fastened to the floor in a displaceable manner, in order to avoid accidents in the case of turbulence.

Examples of rails are described in documents U.S. Pat. No. 6,260,813 A and US 2002/0130219 A.

In addition to fastening rails made of metal, use can also be made of rails in which a partial portion is manufactured from fiber-reinforced polymer.

Document EP 3 020 628 A1 describes a seat rail for holding seats in an aircraft, having a support portion for connection to the cabin floor and having a seat receiving portion with a groove for receiving the end portions of connecting elements which are coupled to the support frame of a seat. In this case, the support portion comprises a profile arrangement made of a fiber-reinforced polymer, in particular using carbon fibers. As a result, the weight of the seat rail is reduced in conjunction with a high structural strength.

FR 2 864 940 describes a fastening rail for aircraft, in which an upper element of the rail is manufactured from a metallic material, whereas a lower element or support element is composed of a carbon composite material. As a result, a high strength of the support element is attained, which is required for supporting seats, toilets, galley elements, etc., for example.

In more recent developments, equipment elements are also formed as modules or floor modules, which are, for example, fastened to a floor grid structure in the aircraft. In this case, systems or cabin equipment are pre-installed outside of the fuselage and subsequently fitted.

When attaching pre-installed floor modules to the fuselage structure, no further bores should be made, in order to protect already fastened system or cabin components against damage.

In order to effect fastening of cabin equipment elements without realizing bores, it is, for example, possible to use thermoplastic materials, since they can be joined together by way of welding technologies or the like, for example.

For use in aircraft, the rails have to meet high requirements. They have to be lightweight and still have a high strength, so that they can withstand the high loading in flight operation.

FIGS. 2a and 2b show a known rail 200 for the fastening of equipment elements in aircraft, with FIG. 2a showing a view from above and FIG. 2b showing a cross section of the known seat rail. The rail has, in the upper part thereof, a crown 201 for the fastening of seats. Flanges 202 are configured on the lower part thereof, in order to fasten the seat rail.

When seat rails or fastening rails are formed of thermoplastic material, there is the problem that, over time, the surface of the rail can be damaged. This relates, in particular, to those regions which are connected to the equipment elements, which are fastened to the rail, in a sliding or fixed manner. By way of example, the surface of the rail can be damaged by the joining together, and the reconfiguration, of cabin equipment. Corrosion processes often occur as a result, particularly in the case of seat rails made of metallic material. However, corrosion-resistant materials, such as titanium, are relatively heavy and expensive.

SUMMARY OF THE INVENTION

It is an object of the invention to provide a rail for the fastening of equipment elements, such as, in particular, seats, in aircraft, the rail having a high strength, being lightweight, and the surface thereof being protected against damage.

To achieve this object, the invention provides a rail for the fastening of equipment elements in aircraft, having a holding region for connection to an equipment element of an aircraft, and having a support region in order to fasten the rail to a carrier element of the aircraft, the rail comprising a metallic shell which is filled with a filler material.

Advantageously, the filler material is formed by a plastic or by a polymer.

In particular, the filler material is formed of thermoplastic or thermoplastic material.

The filler material is preferably fiber-reinforced.

In particular, the filler material contains fibers which are in the form of short fibers.

In particular, the fibers are carbon fibers.

The metallic shell is preferably formed of titanium and/or aluminum.

The metallic shell is formed of a metal alloy, for example.

Advantageously, the rail is produced by injection molding.

In particular, the metallic shell is used as a casting mold for the filler material.

Preferably, the casting mold, together with the filler material after hardening thereof, forms the rail.

The metallic shell is preferably of T-shaped design. In particular, it has a T-shaped cavity for receiving the filler material.

Advantageously, the metallic shell forms the holding region for connection to the equipment element.

A portion of the metallic shell preferably forms the support region for fastening the rail to the carrier element.

In particular, the rail comprises at least one portion which is not filled and which is designed in the form of a flange element for fastening to the carrier element.

Advantageously, the holding region comprises a crown for connection to the equipment element, and two spaced-apart limbs, a flange element extending laterally toward the outside from at least one of the limbs, for example.

Preferably, at least one limb, together with the flange element, forms the support region.

The rail can be designed, in particular, for fastening the equipment elements to the cabin floor. The rail is advantageously designed for the fastening of aircraft seats.

The rail can also be designed for fastening pre-installed cabin equipment elements in the cabin.

According to another aspect, the invention provides a production method for a rail for the fastening of equipment elements in aircraft, in which a molded part, which is manufactured from metal and which has a holding region for the fastening of equipment elements of an aircraft and a support region for fastening to a carrier element of the aircraft, is provided, the molded part being filled with a filler material and, after the rail has been produced, forming a metallic shell for the filler material.

Advantageously, the filler material used in the method is a plastic or a polymer. In particular, the filler material used in the method is a thermoplastic.

Advantageously, fibers are added to the filler material for reinforcing purposes. The fibers are preferably in the form of short fibers.

Fibers which are carbon fibers or are formed of carbon fibers can be added, for example.

In particular, in the method, the metallic shell is formed of titanium and/or aluminum.

The metallic shell can be formed of a metal alloy, for example.

In particular, the rail is produced by means of injection molding.

Preferably, the metallic shell is used as a casting mold and is filled with the filler material, in order to, together with the filler material after hardening thereof, form the rail.

Advantageously, the metallic shell is filled by means of injection, in particular by means of thermoplastic injection. In particular, short fibers are added to the filler material.

In particular, the injection is carried out at both end regions of the molded part.

For example, the injection is carried out in the form of thermoplastic injection or by thermal injection.

In particular, a rail according to the invention is produced by the method.

BRIEF DESCRIPTION OF THE DRAWINGS

Exemplary embodiments of the invention are elucidated in detail below on the basis of the attached drawings. In the drawings.

DETAILED DESCRIPTION OF THE PREFERRED EMBODIMENTS

Figure 1:
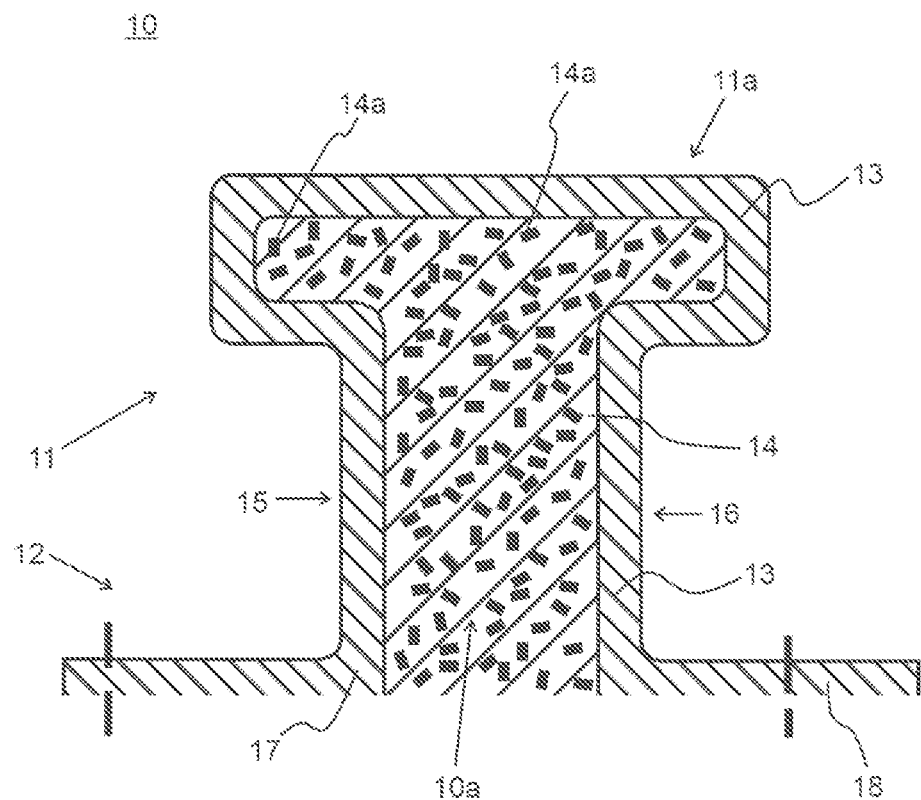
FIG. 1 shows a cross section of a rail for the fastening of seats in an aircraft according to a first preferred embodiment of the invention.
Figures 2A, 2B:
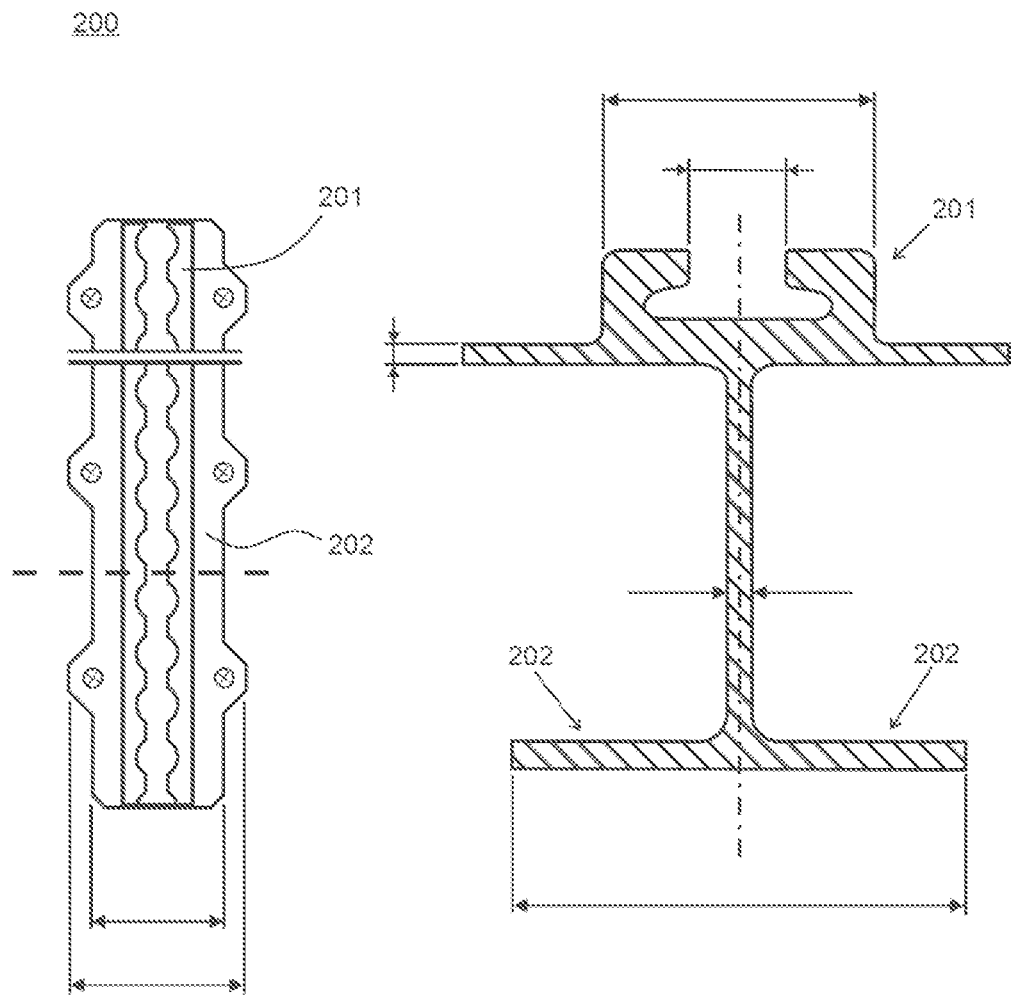
FIGS. 2a and 2b show a known seat rail for the fastening of seats in aircraft, with FIG. 2a showing a view from above and FIG. 2b showing a cross section of the seat rail.

FIG. 1 illustrates a cross section of a rail 10 for the fastening of passenger seats according to a first preferred embodiment of the invention. The rail 10 is designed in the form of a seat rail, with an upper partial region of the rail 10 forming a holding region 11 for connection to an aircraft seat or passenger seat. A support region 12, which is arranged below the holding region 11 in the figure, is used to fasten the rail 10 to a carrier element of the aircraft. The rail 10 has a metallic shell 13 and is filled with a filler material 14.

The filler material 14 is thermoplastic and contains fibers 14a which are in the form of short fibers and which are used to reinforce the filler material 14.

In the exemplary embodiment which is shown here, the fibers 14a are formed of carbon fibers. However, it is also possible to use fibers, and in particular short fibers, which are manufactured from other materials and can be used to reinforce the filler material 14.

The shell 13 forms an outer layer, which substantially surrounds the filler material 14 or covers the latter in the form of a cover layer or sheath layer. The shell 13 forms a metallic protective layer for the filler material 14 and thus provides surface protection for the filler material 14. It is formed such that, in the assembled state of the rail, it covers the filler material 14 completely in the form of an outer layer.

The shell 13 is manufactured from a metal or a metal alloy. It forms a layer or cover layer which is preferably manufactured from titanium, or contains titanium, and which, in particular, protects load-bearing elements or regions of the rail 10 against corrosion, abrasion, and other damage. Aluminum and/or titanium are particularly suitable materials. However, it is also possible for other metallic materials to be used or for other materials to be present.

The rail or seat rail 10 which is filled with the thermoplastic filler material 14 is lighter than a rail which is manufactured entirely from aluminum and/or titanium.

During the production of the rail 10, the metallic outer layer, which later forms the metallic shell 13 of the rail 10, is first provided and used as a mold or casting mold, into which the thermoplastic filler material 14 is introduced by a casting method or by injection. After the filler material 14 has solidified in a cavity 10a of the casting mold, the latter forms the metallic shell 13 which surrounds the thermoplastic filler material 14 and, together with the latter, forms the rail 10. As a result, simple production of the rail 10 is made possible.

As can be seen in FIG. 1, the rail 10 has a T-shaped cross section. It has, in the interior thereof, a region, which likewise has a T-shaped cross section and is filled with the thermoplastic filler material 14 and the short fibers 14a contained therein. The cavity 10a within the metallic shell 13 thus forms a filled T-shaped region or space within the rail 10.

The holding region 11 of the rail 10 has a crown 11a, which is used for connection to a seat or seat element. The crown 11a is formed such that it is used for the fastening of the end portions of connecting elements which are coupled to the support frame of a seat or seat module.

The metallic shell 13 forms the outer boundary of the crown 11a and, in this case, surrounds the hardened thermoplastic material or filler material 14 located therein.

The crown 11a is formed by an upper end portion of the shell 13, which is wider than an adjoining portion of the shell 13 below the crown 11a, the adjoining portion connecting the crown 11a to the holding region 11 and being formed by two parallel side walls or limbs 15, 16. The hardened filler material 14 is located within the crown 11a and also between the side walls or limbs 15, 16 of the metallic shell 13.

The holding region 11 is formed by lower end portions of the metallic shell 13, which is formed as a flange region with flange elements 17, 18. The flange elements 17, 18 extend in a lateral direction, and are used for fastening the rail 10 to a crossmember of the floor structure of the aircraft fuselage and are formed accordingly.

This means that the metallic shell 13 is an integrally formed element, which firstly forms the outer layer of the holding region 11 with the crown 11a, and secondly also forms the support region 12 with the flange elements 17, 18, by way of which the rail 10 can be fastened to a carrier element. In this way, the metallic shell 13 forms the outer wall of the T-shaped rail 10 and the flange portions 17, 18 which extend, at the sides of the rail 10, in a lateral direction. The shell 13 has, at the lower end thereof, an opening, which, however, is likewise covered after the rail has been assembled in the aircraft.

Figure 3:
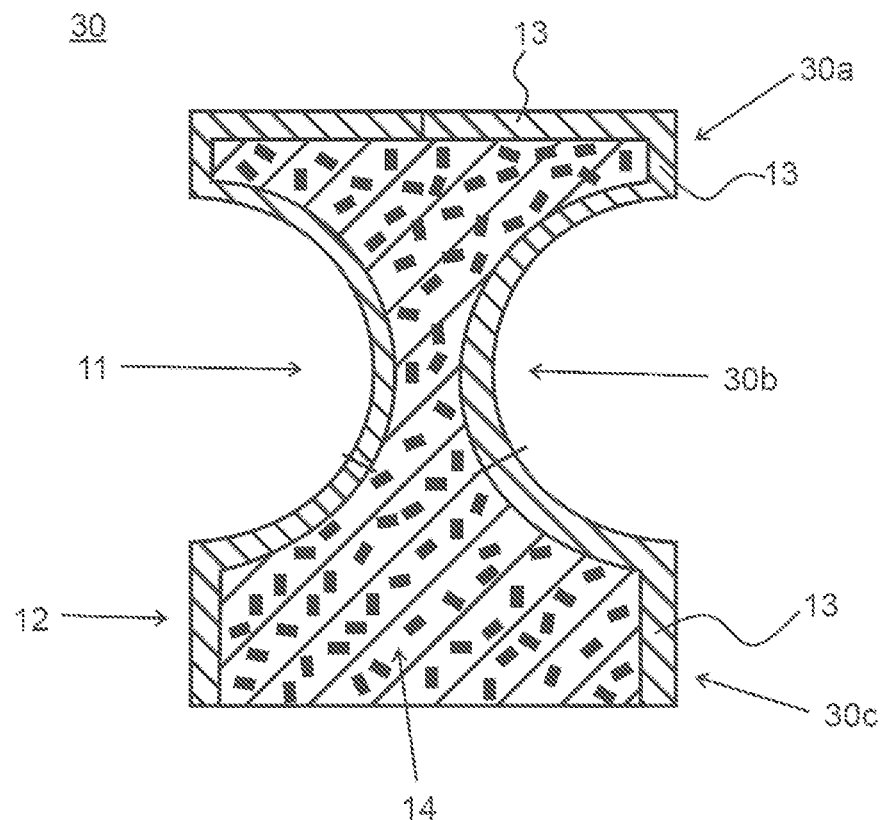
FIG. 3 shows a schematically illustrated cross section of a rail according to a second preferred embodiment of the invention.

FIG. 3 shows a schematic diagram of a cross section of a fastening rail 30 according to a further embodiment of the invention, with no flange portions being illustrated in this case. The rail 30 likewise comprises a shell 13 which is filled with the filler material 14, as described above. However, in this case, the shell 13, and thus also the rail 30, has a different shape than is described above with reference to FIG. 1.

In this example, the rail 30 has a relatively wide upper portion 30a, which initially becomes continuously narrower toward the bottom until a relatively narrow portion 30b is formed, and then becomes continuously wider again toward the lower end until, in turn, a relatively wide lower portion 30c is formed. In this case, the upper, relatively wide portion 30a and the middle, relatively narrow portion 30b form the holding region 11, whereas the lower, relatively wide portion 30c forms the support region 12, which is fastened to a carrier element after the rail has been fitted into the aircraft.

Figure 4:
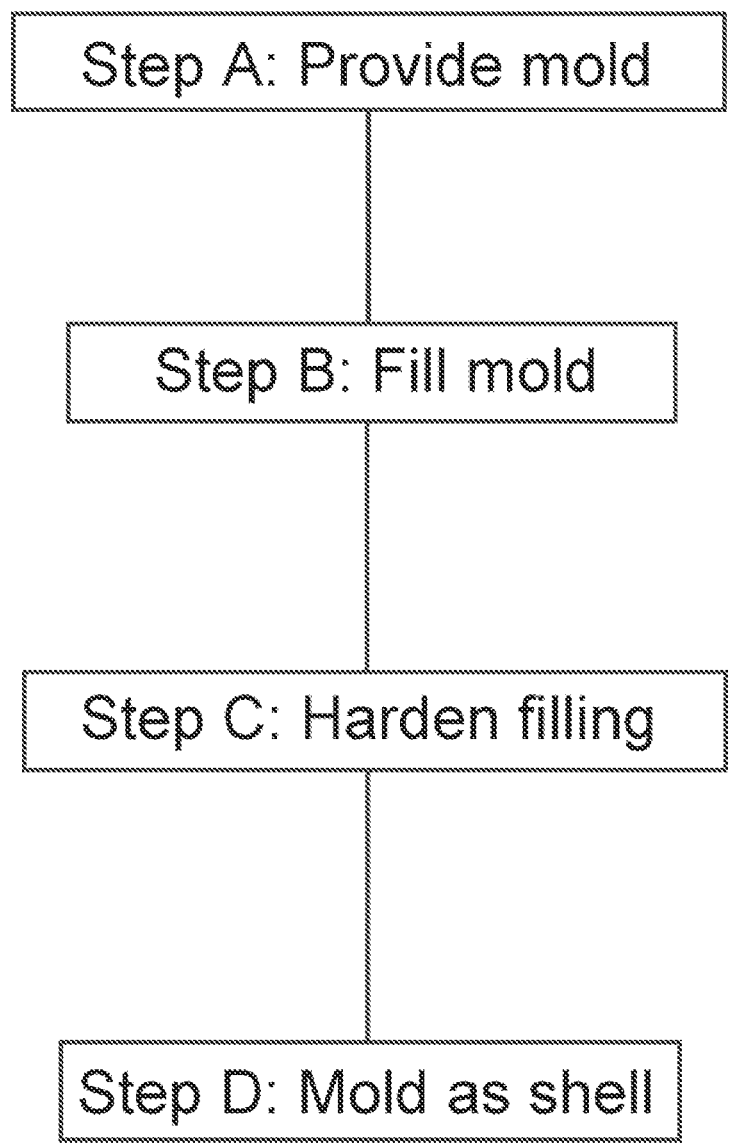
FIG. 4 shows a block diagram showing exemplary steps of the production method according to the invention.

An example of a method for producing a rail according to the present invention is described below on the basis of FIGS. 4 and 5a to 5c, with FIG. 4 showing a flow diagram of the method.

Figure 5A:
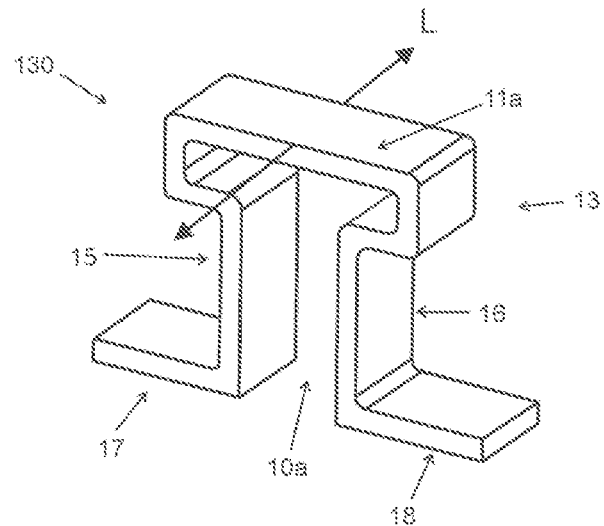
FIGS. 5a to 5c show the rail, shown in FIG. 1, at various stages of the production thereof.

According to FIG. 4, in a first step A of the production method, an elongate metallic profile element 130 is provided as a molded part, such as is illustrated in FIG. 5a. The material and shape of the molded part or profile element 130 are as described above in relation to the shell 13.

The profile element 130 is hollow on the inside and extends in a longitudinal direction L thereof. It has a T-shaped cross section with a crown 11a in the upper region thereof, the crown having a substantially rectangular cross section.

Two limbs 15, 16, which are oriented perpendicularly with respect to the crown 11a and have a mutual spacing, are arranged on the underside of the crown 11a. In this way, the limbs 15, 16 form side walls of the profile element 130, below the crown 11a, which are arranged parallel to each other at a mutual spacing.

The crown 11a, together with the side walls or limbs 15, 16, forms a contiguous hollow space, that is to say, a cavity 10a, in the profile element 130. The cavity 10a is T-shaped and is open at the lower end thereof. In this way, the cavity 10a is surrounded by the metallic shell 13, which is likewise T-shaped in cross section and is open toward the bottom.

At the lower end of the side walls or limbs 15, 16 which extend parallel to each other, a respective flange portion 17, 18, which extends toward the outside in a lateral direction of the profile element 130, is formed. This means that the flange portions 17, 18 extend perpendicularly with respect to the side walls or limbs 15, 16 of the profile element 130. The flange portions 17, 18 are used to fasten the seat rail 10 which is produced from the profile element 130 to a supporting structural element of the aircraft fuselage, such as a crossmember of a PAX floor structure of an aircraft fuselage, for example.

The crown 11a of the profile element 130 is used for fastening seats or seat arrangements, that is to say, the rail 10 produced therefrom is designed in the form of a seat rail.

The profile element 130 forms a metallic layer, for example made of titanium or a titanium alloy, which is provided as a mold or casting mold, or as a mold tool or casting tool, for subsequent filling with the filler material 14. The shell 13, which, after the rail 10 has been produced, forms an outer layer, that is to say, a sheath layer or cover layer of the rail 10, is formed to be as thin as possible and as thick as necessary to ensure adequate protection of the filler material, which is located therein at a later stage, and to provide additional strength for the arising loads or loading of the rail.

Figure 5B:
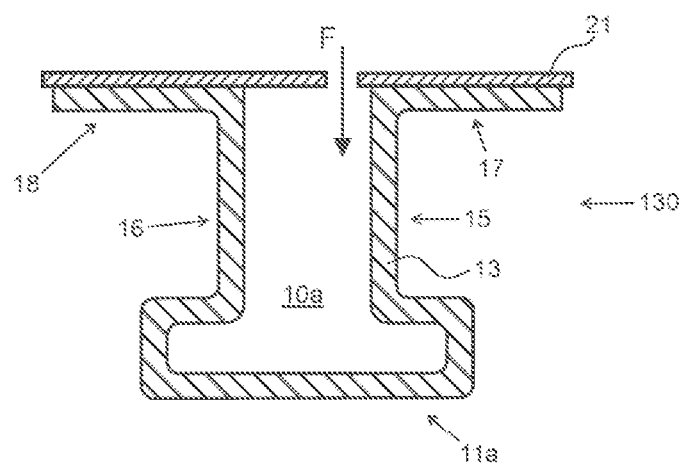

In a next step B of the method for producing the rail 10 (see FIG. 4), the provided profile element 130 is filled. The operation is illustrated in FIG. 5b.

The filling operation is carried out using an injection method, in which thermoplastic material, which contains short fibers for reinforcing purposes, is injected into the interior or into the cavity of the profile element 130. In this case, a thermoplastic casting or injection-molding method is performed, in which the profile element 130, which is provided as a hollow profile, is used as a casting mold or mold tool.

Preferably, the filling operation or thermoplastic injection is carried out at both ends of the profile element 130, which later forms the shell 13 of a seat rail segment. For the injection operation, the profile element 130 is brought into an inverted position, such that the crown 11a is located at the bottom and the cavity 10a is filled with the filler material 14 from the top, as illustrated by the arrow F. In this case, the opening of the profile element 130, which opening now lies at the top, is covered by a cover element 21.

Figure 5C:
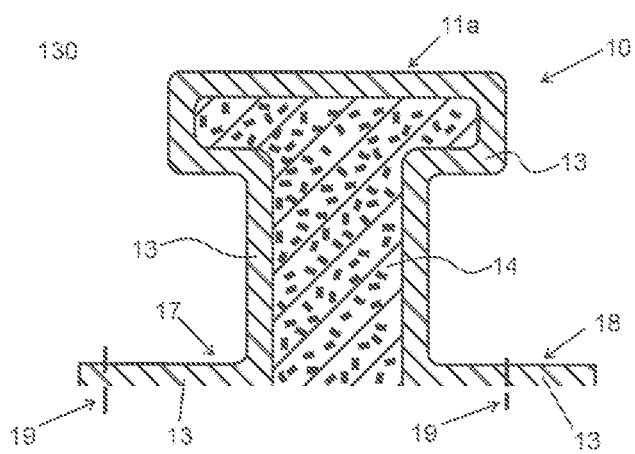

In a next step C according to FIG. 4, the filler material 14 which is located in the cavity 10a of the profile element 130 is hardened. The operation is illustrated in FIG. 5c. FIG. 5c corresponds to FIG. 1, which shows the rail 10, which is produced from the profile element 130 and the filler material 14, and is described in detail above.

The flange elements 17, 18 are provided with fastening means 19, such as, for example, bolts, screws or the like, in order to fasten the produced rail 10, directly or by means of an additional component, to the carrier element provided.

In step D according to FIG. 4, the profile element 130 as shell 13, together with the filler material 14 located therein, is provided as a fastening rail.

The seat rail which is filled with thermoplastic is lighter than a seat rail which is manufactured entirely from aluminum or titanium. By virtue of the metallic cover layer or shell thereof, which for example constitutes a titanium covering, load-bearing elements of the rail are protected against damage, for example as a result of corrosion or abrasion.

The metallic cover layer also provides additional strength, in order to withstand the loading that arises. In particular, a particular resistance to corrosion and abrasion is attained as a result of the metallic cover layer or shell. At the same time, the metallic cover layer is used as a mold tool for the thermoplastic filling during the production of the rail. The flanges of the metallic cover layer can be provided with holes for screws or bolts for fastening the rail. The filling, formed of thermoplastic material with short fibers, provides stability for the metallic cover layer and fundamental strength.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE DESIGNATIONS

10 Rail, seat rail
10a Cavity
11 Holding region
11a Crown
12 Support region
13 Shell, cover layer
14 Filler material
14a Fibers
15, 16 Limbs, side walls
17, 18 Flange elements/flange portions
19 Fastening means
21 Cover element
30 Rail, seat rail
30a Upper portion
30b Middle portion
30c Lower portion
130 Profile element/molded part
200 Rail
201 Crown
202 Flanges
L Longitudinal direction
F Filling direction

The invention claimed is:

1. A method for producing a rail for fastening equipment elements in an aircraft, comprising the steps:
   molding a rail part, being for the fastening of equipment elements of the aircraft, from metal with a holding region and a support region for fastening to a carrier element of the aircraft,
   filling the holding region of the rail part with a filler material and,
   wherein, after the rail part has been produced, the rail part forms a metallic shell for the filler material,
   wherein the metallic shell defines a cavity having a first end separated from a second end by an intermediate portion, the first end having a cross-sectional area greater than a cross-sectional area of the of the intermediate portion taken parallel to the cross-sectional area of the first end,
   wherein the filler material is located within the first end of the cavity and the intermediate portion of the cavity.

2. The method as claimed in claim 1, wherein the filler material used comprises at least one of:
   a plastic;
   a polymer; or
   a thermoplastic.

3. The method as claimed in claim 1, further including a step of adding fibers to the filler material for reinforcing purposes, said fibers comprising at least one of:
   short fibers;
   carbon fibers.

4. The method as claimed in claim 1, wherein the metallic shell comprises at least one of:
   titanium,
   aluminum, or
   a metal alloy.

5. The method as claimed in claim 1, wherein the rail is produced by means of injection molding, the metallic shell being used as a casting mold and being filled with the filler material, in order to, together with the filler material after hardening thereof, form the rail.

6. The method as claimed in claim 1, wherein the metallic shell is filled with the filler material by thermoplastic injection, and comprises at least one of:
   short fibers added to the filler material;
   the injection being carried out at both end regions of the molded rail part;
   the injection being carried out as a thermal injection; or
   the rail being produced for the fastening of equipment elements in the aircraft comprising the holding region for connection to the equipment element of the aircraft, and the support region to fasten the rail to the carrier element of the aircraft, wherein the rail comprises the metallic shell which is filled with the filler material.

* * * * *